United States Patent Office 3,228,257
Patented Jan. 11, 1966

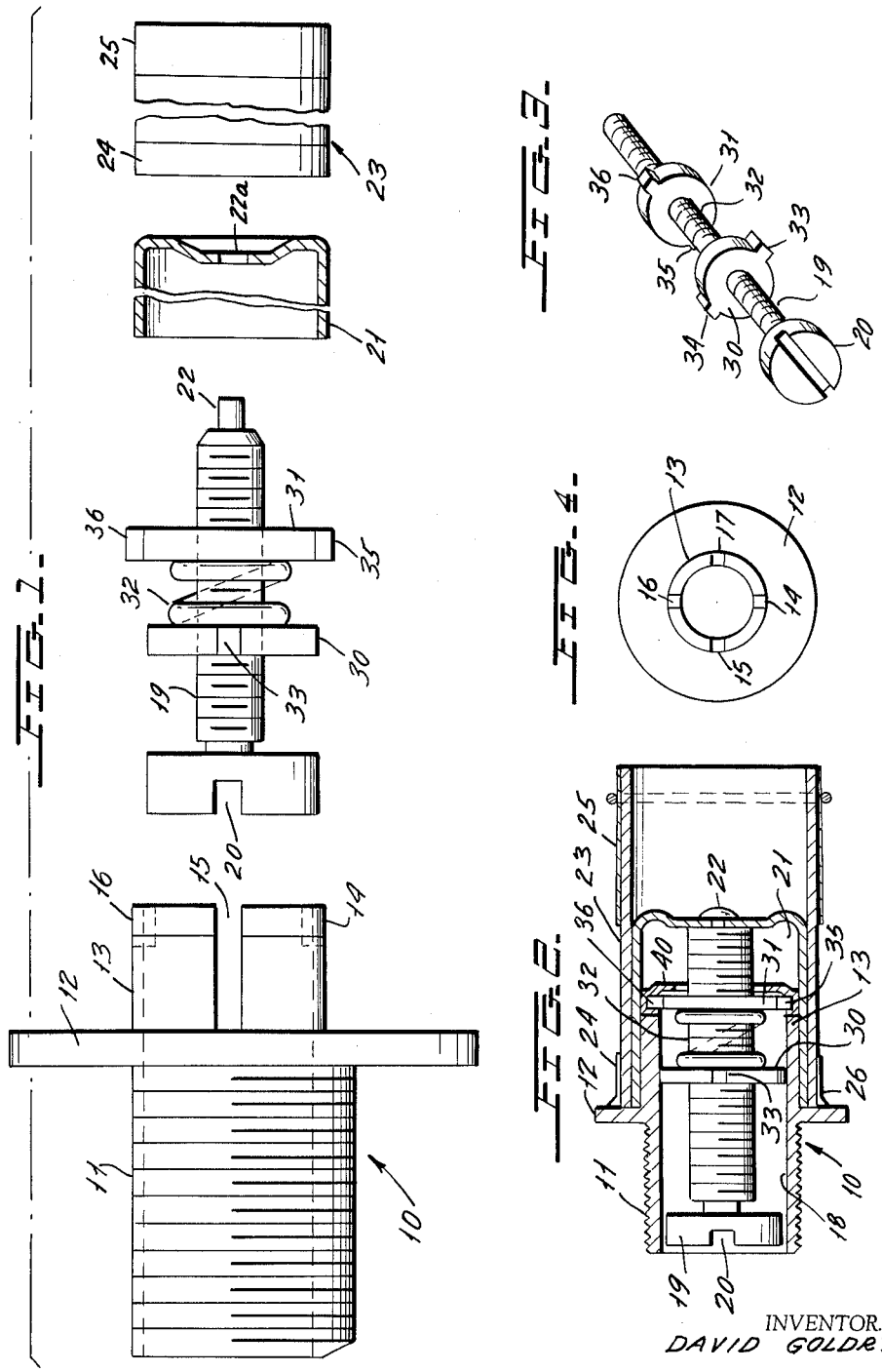

3,228,257
DRIVE MEANS FOR AN ELECTRICAL REACTOR
David Goldryn, Brooklyn, N.Y., assignor to JFD Electronics Corporation, Brooklyn, N.Y., a corporation of New York
Filed Sept. 21, 1962, Ser. No. 225,311
1 Claim. (Cl. 74—424.8)

This invention relates to electrical reactors such as trimmer capacitors and more specifically relates to a novel torque structure which can be adjusted prior to the assembly of the reactor.

Electrical reactors such as trimmer capacitors are well known in the art and are described, for example, in the patent to Kellerman 2,922,093, assigned to the assignee of the present invention.

In such reactors an adjustment member such as a screw is rotated to move a piston with respect to one of the electrodes of the device whereby accurate adjustment can be obtained. In this adjustment system, a torque imparting means is necessary which will prevent backlash in the adjustment screw and will maintain a predetermined torque on the screw to prevent its accidental rotation.

There are many methods of arranging the torque adjustment means. Each of these require that the torque adjustment means such as a spring be assembled during the assembly of the main reactor structure. This creates many problems in the adjustment of the torque and causes many delays and extra expense in the production of such devices.

The present invention provides a novel torque device which is independent of the main assembly and can be sub-assembled and adjusted on the adjustment screw prior to the assembly of the main reactor device.

Accordingly, it is a primary object of this invention to simplify and reduce costs in production of adjustable reactor devices.

Another object of this invention is to provide a novel independent torque-setting device for reactors which is independent of the main assembly of the reactor.

Another object of this invention is to provide a novel constant torque device for reactors.

Another object of the invention is to provide a long life tuning device which provides full thread engagement.

These and other objects of this invention will become apparent from the following description when taken in connection with the drawings, in which:

FIGURE 1 shows an exploded plan view partially in cross-section of a reactor adapted with the novel torque adjustment device of the invention.

FIGURE 2 shows a partial cross-sectional view of the reactor of FIGURE 1 when assembled.

FIGURE 3 shows a perspective view of the sub-assembled screw and torque adjustment device.

FIGURE 4 shows a front view of the bushing which receives the torque controlling device.

Referring now to FIGURES 1 through 4, the reactor shown therein is of the standard type and comprises a mounting bushing 10 which can have a threaded surface 11 which may receive a nut which can tighten an electrical lead against the mounting flange 12 which extends from bushing 10.

Bushing 10 has a further extending portion 13 which extends beyond the right hand surface of flange 12.

As best seen in FIGURE 4, extending bushing portion 31 has four slots 14, 15, 16 and 17 therein. The bushing 10 as best seen in FIGURE 2 then has an opening 18 therethrough for receiving an adjustment screw 19 which has a slotted head 20 which can receive an adjustment tool such as a screw driver. The right hand end of screw 20 then receives a conductive adjustment piston 21 as by spot welding to extending end 22 of screw 10 as illustrated in FIGURE 2.

A dielectric cylinder 23 having conductive band 24 and electrode 25 is then secured to flange 12 as by soldering at solder portions 26 shown in FIGURE 2.

It will be apparent that by axially displacing piston 21 with respect to electrode 25 that adjustment of capacitance between a lead connected to bushing 10 and a lead connected to electrode 25 can be obtained.

In order to provide a torque which must be overcome by screw 10 a novel torque assembly is provided for the reactor which includes nuts 30 and 31 which are threaded on screw 19 and a compression spring 32 which is captured between nuts 30 and 31.

Each of nuts 30 and 31 have diametrically opposite extending ears 33–34 and 35–36. When the capacitor is assembled, the ears 33 and 34 will be slidably received in grooves 15 and 17 respectively of bushing portion 16 (FIGURE 4.) In a similar manner, the ears 35 and 36 of nut 31 will be received in slots 14 and 16 of extending bushing portion 13. It is to be noted that other means of securing nuts 30 and 31 to bushing portion 13 could be used. By way of example, nut 30 could be a circular nut which is press fitted into bushing 13. Moreover, where extending ears and cooperating slots are used, an increase in the number of ears and slots used increases the sensitivity of the torque adjustment.

In order to retain the nuts 30 and 31 in a predetermined position with respect to bushing portion 13, a portion of the right hand end of bushing portion 13 is rolled over tension nut 31 as illustrated by rolled over section 40 shown in FIGURE 2. Any similar fastening could be used in place of the rolled over portion such as brazing or the like.

When the reactor is assembled as illustrated in FIGURE 2, it will be apparent that rotation of screw 19 will cause the screw to advance or retract with respect to bushing 10 to thereby move piston 21 along the axis of dielectric form 23 to thereby adjust the capacitance of the device.

The nut 31 which is captured at the end of bushing 13 serves as the support for the screw 19 with the enlarged head portion 20 fitting closely within opening 18 to permit linear motion of the screw along the axis of the device.

One particular advantage of the invention lies in the manner in which it simplifies assembly of the device. Thus, the screw 19, nuts 30 and 31 and spring 32 may be sub-assembled independently of the main assembly as illustrated in FIGURE 3.

Referring to FIGURE 3, the nut 30 is first threaded on screw 19. The spring 32 is thereafter slid over the end of screw 19 and thereafter screw 31 is threaded onto screw 19. The nuts 31 and 30 are then adjusted with respect to one another until the desired compression of spring 32 is achieved when the nuts are in a position where a line through ears 33 and 34 is perpendicular to a line through ears 35 and 36.

Note that the relationship of the ears and number of ears be such that they will register with whichever relationship exists between slots such as 14 through 17 in bushing portion 13.

Thereafter, the completely adjusted torque controlling device including the screw 19 is inserted into bushing 10 and is retained in that position as by rolling over end bushing portion 40 which captures nut 31 or in any other desired manner. The shell or piston 21 is thereafter put into position with extending portion 22 extending through opening 22a in the right-hand end of piston 21. Extending portion 22 and piston 21 are then welded together.

The dielectric form 23 which may be of glass is then connected to mounting bushing 10 by soldering from flange 12 to metallic band 24 which is deposited on dielectric form 23.

Because of this novel dependent torque adjusting mechanism, it will now be apparent that the assembly techniques are simplified since the torque has been pre-set for the assembly of the device.

It has been further found that this type of structure leads to a long life mechanism having low wear characteristics as compared to conventional split bushing arrangements.

Although I have described preferred embodiments of my invention, many variations and modifications will now be obvious to those skilled in the art, and I prefer therefore to be limited not by the specific disclosure herein but only by the appended claim.

The embodiments of the invention in which an exclusive privilege or property is claimed are defined as follows:

An electrical reactor comprising a bushing member having an opening therein, a threaded rotatable adjusting member received in said opening, a first nut, a second nut, and a biasing spring; said first and second nuts being threaded on said threaded rotatable adjusting means and being spaced from one another; said biasing spring being captured between said first and second nuts and biasing said first and second nuts away from one another; a first portion of each of said first and second nuts being captured by said bushing to prevent rotation of said first and second nuts with respect to said bushing when said rotatable adjusting member is rotated; at least one of said nuts having a portion thereof connected to said bushing member to prevent axial movement of said at least one of said nuts with respect to said bushing; said rotatable adjusting member being moved along the axis thereof with respect to said bushing when said rotatable adjusting member is rotated; said first portions of said first and second nuts comprise first and second tabs extending from said first and second nuts respectively; said bushing having first and second axially directed slots therein; said first and second tabs of said first and second nuts respectively being captured in said first and second slots respectively.

References Cited by the Examiner
UNITED STATES PATENTS

| | | | |
|---|---|---|---|
| 1,552,185 | 9/1925 | Alcox | 317—253 |
| 2,607,826 | 8/1952 | Barnes | 317—249 |
| 3,071,716 | 1/1963 | Young | 317—249 |

JOHN F. BURNS, *Primary Examiner.*

E. JAMES SAX, *Examiner.*